US009755489B2

(12) United States Patent
Takemoto et al.

(10) Patent No.: US 9,755,489 B2
(45) Date of Patent: Sep. 5, 2017

(54) METHOD FOR MANUFACTURING ROTOR CORE

(71) Applicant: TOYOTA BOSHOKU KABUSHIKI KAISHA, Aichi-ken (JP)

(72) Inventors: Masaaki Takemoto, Toyokawa (JP); Takasuke Shikida, Okazaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 378 days.

(21) Appl. No.: 13/924,894

(22) Filed: Jun. 24, 2013

(65) Prior Publication Data
US 2014/0000096 A1 Jan. 2, 2014

(30) Foreign Application Priority Data

Jun. 27, 2012 (JP) ................................. 2012-144038

(51) Int. Cl.
*H02K 15/03* (2006.01)
*H02K 1/27* (2006.01)

(52) U.S. Cl.
CPC ............. *H02K 15/03* (2013.01); *H02K 1/276* (2013.01); *H02K 1/2766* (2013.01); *Y10T 29/49012* (2015.01)

(58) Field of Classification Search
CPC ........ H02K 15/03; H02K 15/02; H02K 15/00; Y10T 29/49012; Y10T 29/49009
USPC ......... 29/596, 598, 602.1, 607, 609; 310/46, 310/40 R
See application file for complete search history.

(56) References Cited

U.S. PATENT DOCUMENTS

| 5,581,140 | A | 12/1996 | Futami et al. | |
|---|---|---|---|---|
| 6,353,275 | B1 | 3/2002 | Nishiyama et al. | |
| 8,766,505 | B2 * | 7/2014 | Saito | H02K 1/276 310/156.56 |
| 8,922,084 | B2 * | 12/2014 | Nagai | H02K 1/2766 310/114 |

(Continued)

FOREIGN PATENT DOCUMENTS

| CN | 101501969 | 8/2009 |
|---|---|---|
| CN | 201754534 | 3/2011 |

(Continued)

OTHER PUBLICATIONS

Japanese Office action dated Jul. 8, 2014.

(Continued)

*Primary Examiner* — Peter DungBa Vo
*Assistant Examiner* — Kaying Kue
(74) *Attorney, Agent, or Firm* — Greenblum & Bernstein, P.L.C.

(57) ABSTRACT

A rotor core is manufactured by forming thin plate-like core pieces including holes, forming a lamination body including insertion holes by laminating the core pieces, and inserting and embedding a permanent magnet in each of the insertion holes of the lamination body. The holes of each core piece include one or more first holes, in each of which a position determining portion for determining the position of the permanent magnet is formed, and one or more second holes, in which a position determining portion is not formed. Each insertion hole of the lamination body is formed by overlapping first holes of some of the core pieces and second holes of the remaining core pieces.

14 Claims, 8 Drawing Sheets

(56) References Cited

U.S. PATENT DOCUMENTS

| | | |
|---|---|---|
| 2008/0007131 A1 | 1/2008 | Cai et al. |
| 2008/0098587 A1* | 5/2008 | Mitsui .................. H02K 1/148 29/598 |
| 2009/0045689 A1* | 2/2009 | Haruno ................. H02K 1/276 310/156.56 |
| 2009/0115280 A1* | 5/2009 | Nakayama ........... H02K 1/2766 310/156.53 |
| 2009/0230803 A1 | 9/2009 | Nakayama et al. |
| 2010/0052463 A1* | 3/2010 | Saito .................... B21D 28/22 310/216.001 |
| 2011/0000079 A1* | 1/2011 | Fukumaru ............ H02K 1/2766 29/598 |
| 2011/0006632 A1 | 1/2011 | Nakayama et al. |
| 2011/0115328 A1 | 5/2011 | Nakayama et al. |
| 2012/0007464 A1* | 1/2012 | Saito .................... H02K 1/276 310/216.051 |
| 2012/0091846 A1* | 4/2012 | Nagai ................... H02K 1/2766 310/156.01 |
| 2012/0119604 A1 | 5/2012 | Nakayama et al. |
| 2012/0200185 A1* | 8/2012 | Sano .................... H02K 1/2766 310/156.01 |
| 2012/0200186 A1* | 8/2012 | Sano .................... H02K 1/2766 310/156.01 |
| 2012/0222289 A1* | 9/2012 | Nagai ................... H02K 1/276 29/598 |
| 2013/0113326 A1 | 5/2013 | Morishita et al. |
| 2013/0113327 A1 | 5/2013 | Morishita et al. |

FOREIGN PATENT DOCUMENTS

| | | |
|---|---|---|
| EP | 1641103 | 3/2006 |
| JP | 09-200982 | 7/1997 |
| JP | 2005-184968 | 7/2005 |
| JP | 2005-312153 | 11/2005 |
| JP | 2007-020350 | 1/2007 |
| JP | 2007-181254 | 7/2007 |
| JP | 2009-131140 | 6/2009 |
| JP | 5005830 | 8/2012 |
| JP | 2012-170190 | 9/2012 |

OTHER PUBLICATIONS

Chinese Official Action for CN app. No. 201310256367.5 dated May 27, 2015, along with an English-language translation thereof.
Chinese Office Action for CN App. No. 201310256367.5 dated Dec. 11, 2015, along with English-language translation thereof.
Japanese Office Action for JP App. No. 2012-144038 dated Dec. 1, 2015.

* cited by examiner

Fig.11
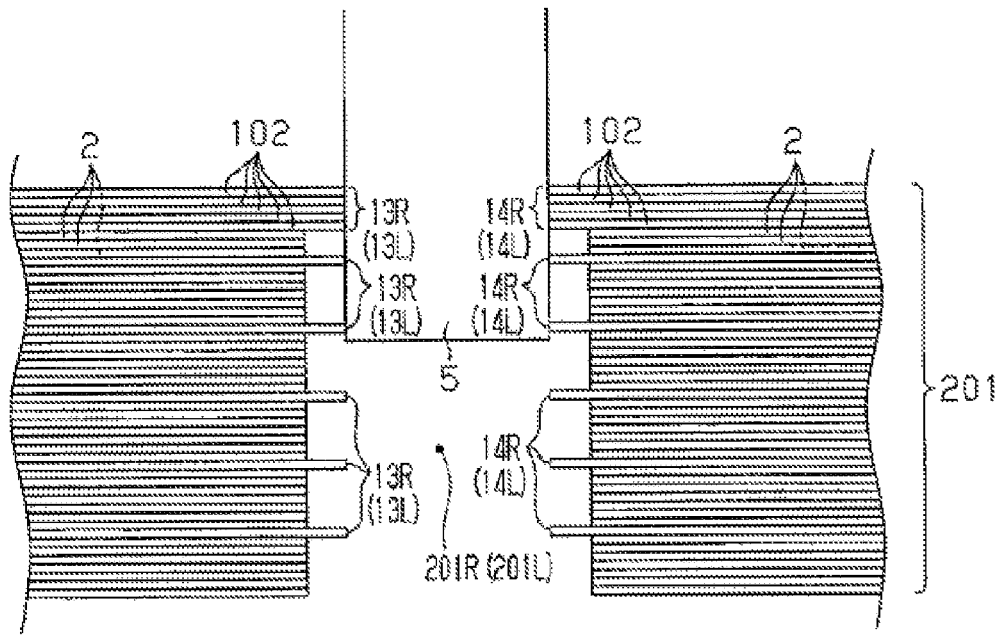
Fig.12 *PRIOR ART*
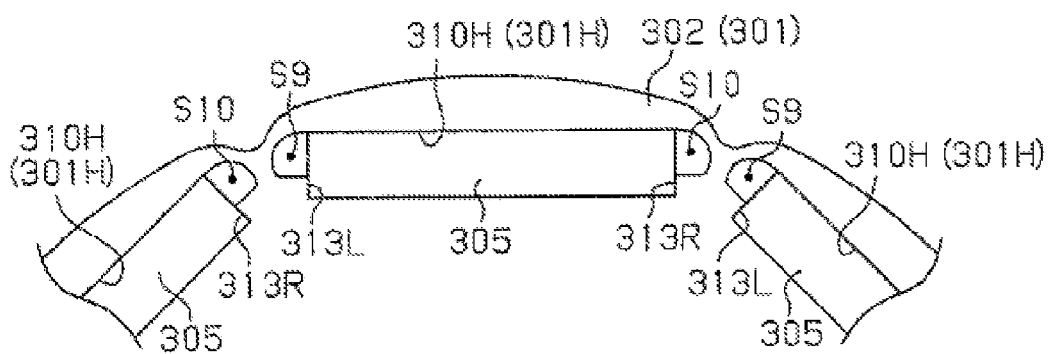

ular electric machine such as a
motor and a generator.

METHOD FOR MANUFACTURING ROTOR CORE

BACKGROUND OF THE INVENTION

The present invention relates to a method for manufacturing a rotor core of a rotary electric machine such as a motor and a generator.

A rotor core of an embedded magnet motor disclosed in Japanese Laid-Open Patent Publication No. 2007-20350 is manufactured as follows. That is, a lamination body 301 is first formed by laminating thin plate-like core pieces 302 each having elongated holes 310H as shown in FIG. 12. Then, a permanent magnet 305 is inserted and embedded in each of insertion holes 301H of the lamination body 301 so that a rotor core is manufactured.

Step-like position determining portions 313R, 313L for determining the position of each permanent magnet 305 are provided on both longitudinal ends of each elongated hole 310H of the core piece 302 to prevent the permanent magnet 305 from being displaced in the longitudinal direction of the elongated hole 310H. Therefore, when filling gaps S9, S10 between the inner wall of each insertion hole 301H of the lamination body 301 and the associated permanent magnet 305 with filling material such as plastic material after inserting each permanent magnet 305 in the associated insertion hole 301H, the permanent magnet 305 will not be displaced before the filling material hardens.

However, the position determining portions 313R, 313L provided in each elongated hole 310H of the core piece 302 increase the area of a magnetic passage. As a result, the amount of magnetic flux that leaks through the magnetic passage without flowing to the stator is increased. Thus, there is room for improvement in increasing the output torque of the motor.

SUMMARY OF THE INVENTION

Accordingly, it is an objective of the present invention to provide a method for manufacturing a rotor core that facilitates determining the position of permanent magnets in insertion holes of a lamination body, and that improves the efficiency of a rotary electric machine such as a motor.

To achieve the foregoing objective and in accordance with one aspect of the present invention, a method for manufacturing a rotor core is provided that includes: forming thin plate-like core pieces, each having a plurality of holes; forming a lamination body including a plurality of insertion holes by laminating the core pieces; and inserting and embedding a permanent magnet in each of the insertion holes of the lamination body. The holes of each core piece includes one or more first holes, in each of which a position determining portion for determining the position of the corresponding permanent magnet is formed, and one or more second holes, in which a position determining portion is not formed. Each insertion hole of the lamination body has at least one of the first holes and at least one of the second holes.

Other aspects and advantages of the invention will become apparent from the following description, taken in conjunction with the accompanying drawings, illustrating by way of example the principles of the invention.

BRIEF DESCRIPTION OF THE DRAWINGS

FIG. 8 is an exploded perspective view of the lamination body according to the first embodiment;

FIG. 11 is a cross-sectional view illustrating a lamination body of core pieces that configures a rotor core according to a third embodiment of the present invention; and FIG. 12 is an enlarged plan view illustrating mainly one of insertion holes of a conventional rotor core.

DETAILED DESCRIPTION OF THE PREFERRED EMBODIMENTS

First Embodiment

A first embodiment of the present invention will now be described with reference to FIGS. 1 to 8.

Figure 1:
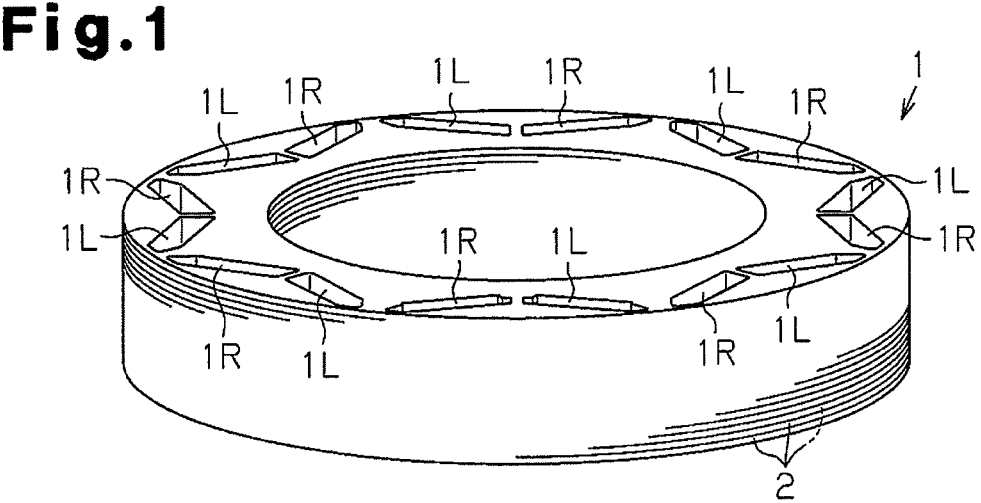
FIG. 1 is a perspective view illustrating a lamination body of core pieces that configures a rotor core according to a first embodiment of the present invention.
Figure 2:
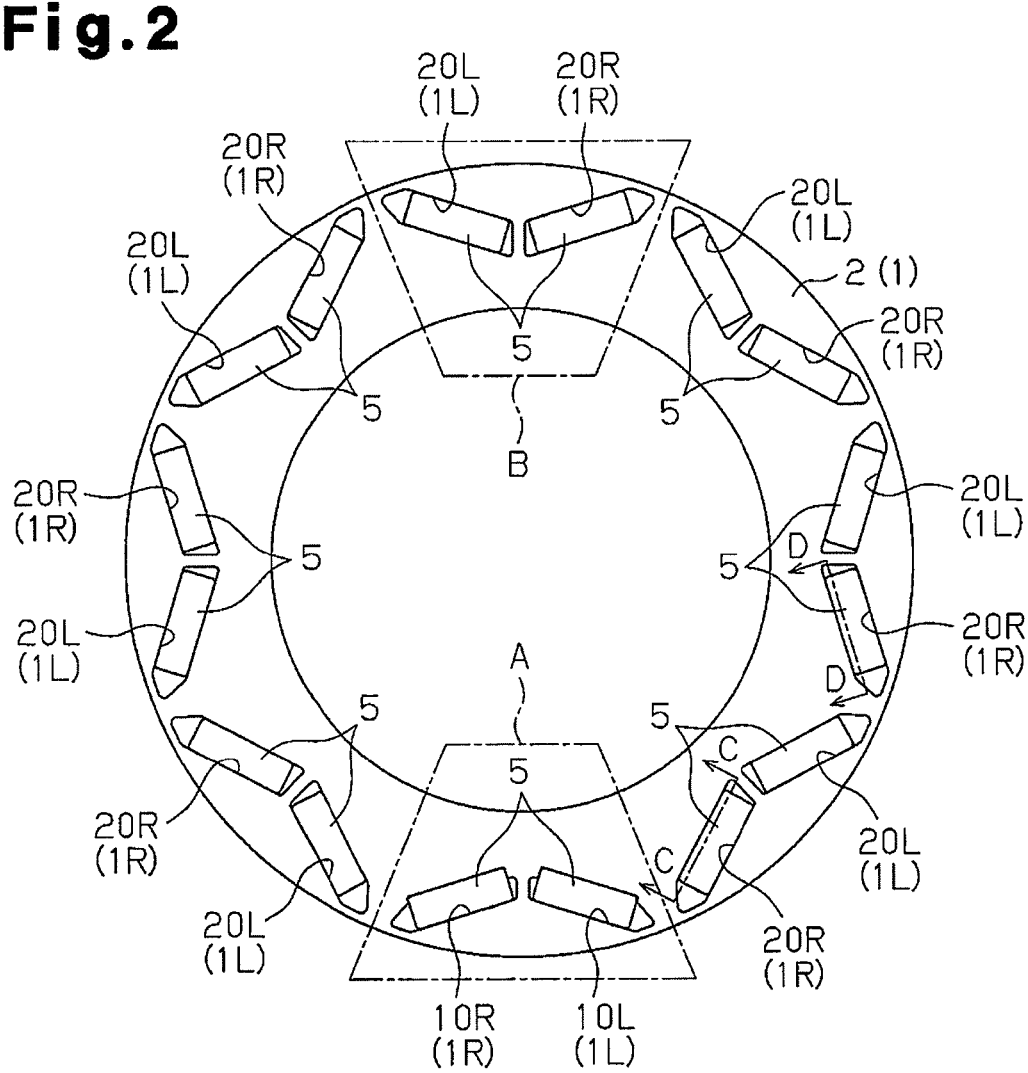
FIG. 2 is a plan view illustrating the rotor core according to the first embodiment.

As shown in FIGS. 1 and 2, the rotor core includes a lamination body 1, which is formed by laminating thin plate-like and ring-shaped core pieces 2. The lamination body 1 includes pairs of a right insertion hole 1R and a left insertion hole 1L. A permanent magnet 5 is inserted in each of the insertion holes 1R, 1L.

Figure 5A:
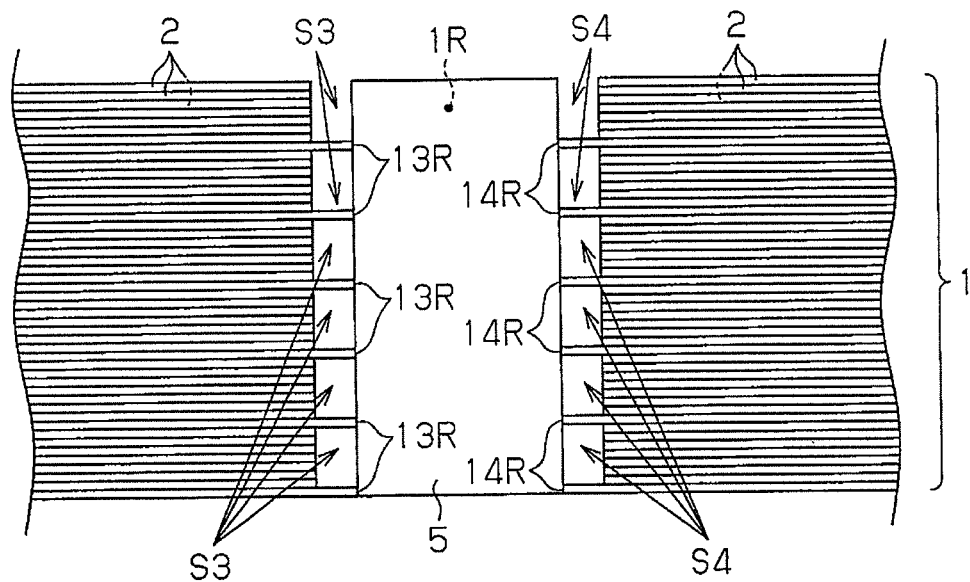
FIG. 5(a) is a cross-sectional view taken along line C-C in FIG. 2, illustrating the rotor core.
Figure 5B:
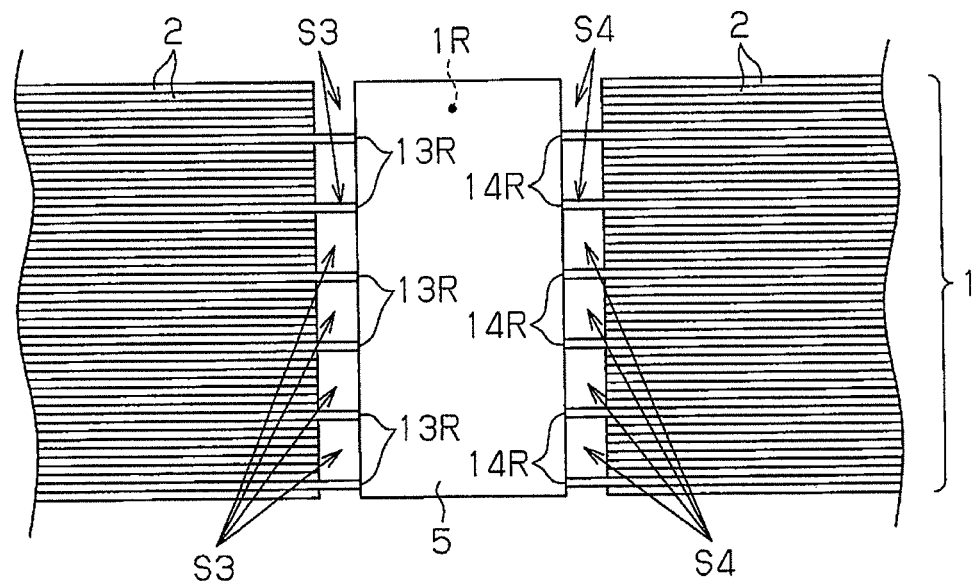
FIG. 5(b) is a cross-sectional view taken along line D-D in FIG. 2, illustrating the rotor core.

As shown in FIG. 2, each core piece 2 includes a pair of a first right hole 10R and a first left hole 10L, and seven pairs of a second right hole 20R and a second left hole 20L. The first right hole 10R has a shape different from the second right hole 20R. The first left hole 10L has a shape different from the second left hole 20L. The pair of the first right hole 10R and the first left hole 10L and the pairs of the second right hole 20R and the second left hole 20L of each core piece 2 are arranged in the circumferential direction of the core piece 2 at equal angular intervals, that is, at intervals of 45 degrees. Each right insertion hole 1R of the lamination body 1 is formed by the first right holes 10R of some of the core pieces 2 and the second right holes 20R of the remaining core pieces 2 that overlap one another. Each left insertion hole 1L of the lamination body 1 is formed by the first left holes 10L of some of the core pieces 2 and the second left holes 20L of the remaining core pieces 2 that overlap one another. The rotor core has a cross-sectional structure as shown in FIGS. 5(a) and 5(b).

Figure 3:
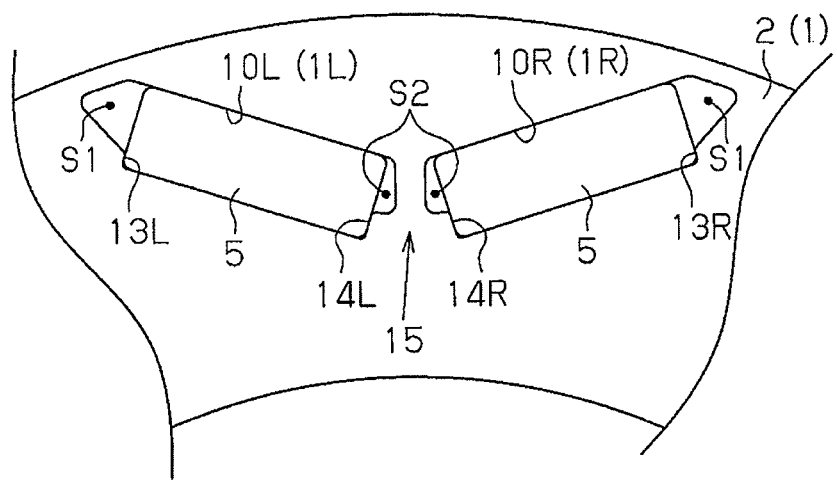
FIG. 3 is an enlarged plan view illustrating the part indicated by character A in FIG. 2.

As shown in FIG. 3, the first right holes 10R and the first left holes 10L of each core piece 2 are elongated. Each of the first right elongated holes 10R and the associated one of the first left elongated holes 10L extend to incline opposite to each other with respect to the circumferential direction of the core piece 2, that is, the tangential direction of the core piece 2. A bridge portion 15 is formed between each of the first right elongated holes 10R and the associated one of the first left elongated holes 10L of each core piece 2.

Each first right elongated hole 10R of each core piece 2 includes two longitudinal ends. One of the ends is located radially outward of the core piece 2 with respect to the other end. A gap S1 is provided between the wall defining the outer end of each first right elongated hole 10R, and the right side surface of the permanent magnet 5 inserted in the first right elongated hole 10R, that is, one of the side surfaces of the permanent magnet 5 that opposes the afore-mentioned wall. A gap S2 is provided between the wall defining the inner end of each first right elongated hole 10R, and the left side surface of the permanent magnet 5 inserted in the first right elongated hole 10R, that is, another side surface of the associated permanent magnet 5 that opposes the afore-mentioned wall.

Similarly, each first left elongated hole 10L of each core piece 2 includes two longitudinal ends. One of the ends is located radially outward of the core piece 2 with respect to the other end. A gap S1 is provided between the wall defining the outer end of each first left elongated hole 10L, and the left side surface of the permanent magnet 5 inserted in the first left elongated hole 10L, that is, one of the side surfaces of the permanent magnet 5 that opposes the afore-mentioned wall. A gap S2 is provided between the wall defining the inner end of each first left elongated hole 10L, and the right side surface of the associated permanent magnet 5 inserted in the first left elongated hole 10L, that is, another side surface of the associated permanent magnet 5 that opposes the afore-mentioned wall.

An outer position determining portion 13R and an inner position determining portion 14R for determining the position of each permanent magnet 5 inserted in the associated first right elongated hole 10R are provided on the outer end and the inner end of each first right elongated hole 10R. The outer position determining portion 13R is formed by a step provided at a portion located radially inward of the core piece 2 among the walls defining the outer end of the first right elongated hole 10R. The step abuts against the right side surface of the permanent magnet 5 inserted in the first right elongated hole 10R. Thus, the permanent magnet 5 is prevented from being displaced radially outward of the core piece 2 in the longitudinal direction of the first right elongated hole 10R. The inner position determining portion 14R is formed by a step provided at a portion located radially inward of the core piece 2 among the walls defining the inner end of the first right elongated hole 10R. The step abuts against the left side surface of the permanent magnet 5 inserted in the first right elongated hole 10R. Thus, the permanent magnet 5 is prevented from being displaced radially inward of the core piece 2 in the longitudinal direction of the first right elongated hole 10R.

An outer position determining portion 13L and an inner position determining portion 14L for determining the position of each permanent magnet 5 inserted in the associated first left elongated hole 10L are provided on the outer end and the inner end of the first left elongated hole 10L. The outer position determining portion 13L is formed by a step provided at a portion located radially inward of the core piece 2 among the walls defining the outer end of the first left elongated hole 10L. The step abuts against the left side surface of the permanent magnet 5 inserted in the first left elongated hole 10L. Thus, the permanent magnet 5 is prevented from being displaced radially outward of the core piece 2 in the longitudinal direction of the first left elongated hole 10L. The inner position determining portion 14L is formed by a step provided at a portion located radially inward of the core piece 2 among the walls defining the inner end of the first left elongated hole 10L. The step abuts against the right side surface of the permanent magnet 5 inserted in the first left elongated hole 10L. Thus, the permanent magnet 5 is prevented from being displaced radially inward of the core piece 2 in the longitudinal direction of the first left elongated hole 10L.

Figure 4:
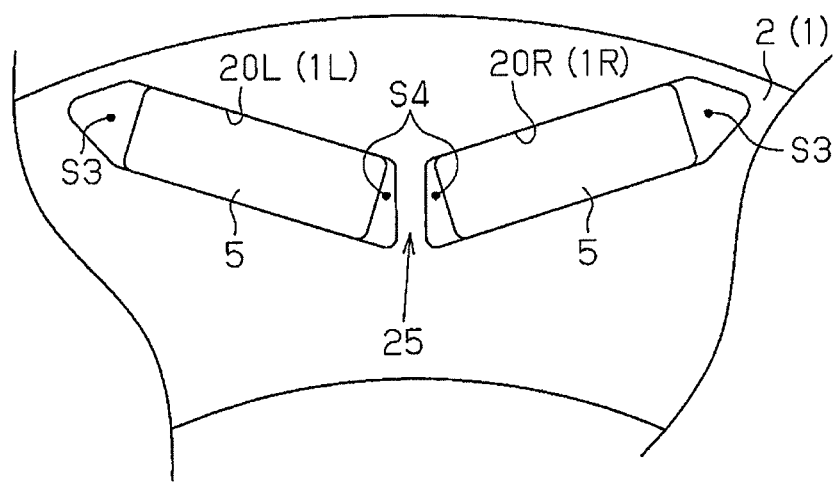
FIG. 4 is an enlarged plan view illustrating the part indicated by character B in FIG. 2.

As shown in FIG. 4, the second right holes 20R and the second left holes 20L of each core piece 2 are elongated and have substantially the same shapes as the first right elongated hole 10R and the first left elongated hole 10L of the core piece 2, respectively. A bridge portion 25 is formed between the second right elongated hole 20R and the second left elongated hole 20L of each pair of each core piece 2.

Each second right elongated hole 20R of each core piece 2 includes two longitudinal ends. One of the ends is located radially outward of the core piece 2 with respect to the other end. A gap S3 is provided between the wall defining the outer end of each second right elongated hole 20R, and the right side surface of the permanent magnet 5 inserted in the second right elongated hole 20R, that is, one of the side surfaces of the permanent magnet 5 that opposes the afore-mentioned wall. A gap S4 is provided between the wall defining the inner end of each second right elongated hole 20R, and the left side surface of the permanent magnet inserted in the second right elongated hole 20R, that is, another side surface of the associated permanent magnet 5 that opposes the afore-mentioned wall.

Similarly, each second left elongated hole 20L of each core piece 2 includes two longitudinal ends. One of the ends is located radially outward of the core piece 2 with respect to the other end. A gap S3 is provided between the wall defining the outer end of each second left elongated hole 20L, and the left side surface of the permanent magnet 5 inserted in the second left elongated hole 20L, that is, one of the side surfaces of the permanent magnet 5 that opposes the afore-mentioned wall. A gap S4 is provided between the wall defining the inner end of each second left elongated hole 20L, and the right side surface of the permanent magnet 5 inserted in the second left elongated hole 20L, that is, another side surface of the associated permanent magnet 5 that opposes the afore-mentioned wall.

However, the second right elongated hole 20R does not have the structure corresponding to the outer position determining portion 13R or the inner position determining portion 14R of the first right elongated hole 10R. Thus, the gaps S3, S4 of the second right elongated hole 20R are larger than the gaps S1, S2 of the first right elongated hole 10R, respectively. Similarly, the second left elongated hole 20L does not have the structure corresponding to the outer position determining portion 13L or the inner position determining portion 14L of the first left elongated hole 10L. Thus, the gaps S3, S4 of the second left elongated hole 20L are larger than the gaps S1, S2 of the first left elongated hole 10L, respectively.

Since the second right elongated hole 20R and the second left elongated hole 20L do not have the inner position determining portions 14R, 14L, the area of the bridge portion 25 between the second right elongated hole 20R and the second left elongated hole 20L is smaller than the area of the bridge portion 15 between the first right elongated hole 10R and the first left elongated hole 10L. That is, the area of the permanent magnet 5 inserted in the second right elongated hole 20R or the second left elongated hole 20L that contacts the wall defining the second right elongated hole 20R or the second left elongated hole 20L is smaller than the area of the permanent magnet 5 inserted in the first right elongated hole 10R or the first left elongated hole 10L that contacts the wall defining the first right elongated hole 10R or the first left elongated hole 10L. This reduces the amount of magnetic flux that leaks without flowing to the stator.

A method for manufacturing the above-mentioned rotor core will now be described.

Figure 6:
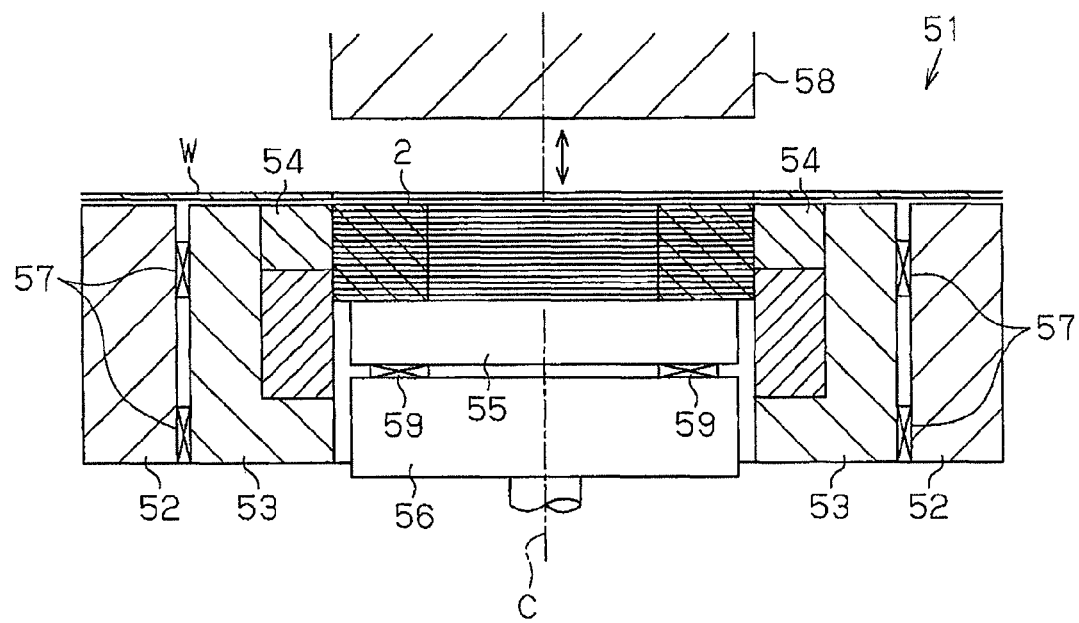
FIG. 6 is a cross-sectional view illustrating a rotary lamination apparatus according to the first embodiment.

The lamination body 1 of the rotor core is formed by using, for example, a rotary lamination apparatus 51 as shown in FIG. 6. In the rotary lamination apparatus 51, a substantially cylindrical holding member 53 is rotatably supported on the inner circumference of a die set 52 via radial bearings 57. A short cylindrical die 54 is secured to the inner circumference of the holding member 53. The holding member 53 is driven by a non-illustrated motor, and is intermittently rotated at a predetermined angle (in this embodiment, 45 degrees) in one direction together with the die 54. A punch 58, which can be raised and lowered along a central axis C of the die 54, is arranged above the die 54. A mounting table 56, which is movable along the central axis C of the die 54, is arranged inside the die 54. A receiving table 55, which is rotatable about the central axis C, is supported on the upper surface of the mounting table 56 via a thrust bearing 59.

Figure 7:
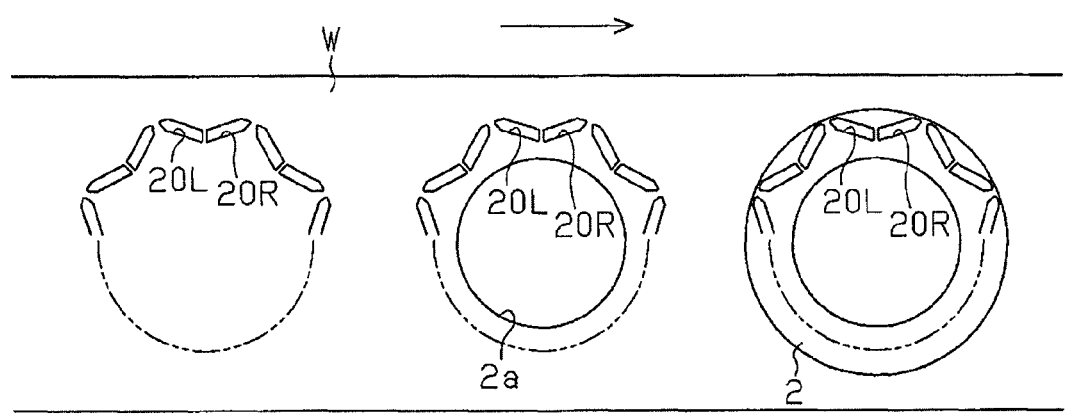
FIG. 7 is a schematic diagram illustrating a process in which a core piece is punched out from thin plate according to the first embodiment.

A thin plate W shown in FIG. 7 is intermittently carried from the left to right of the drawing. At this time, first, non-illustrated punch and die cooperate to punch a pair of a first right elongated hole 10R and a first left elongated hole 10L, and seven pairs of a second right elongated hole 20R and a second left elongated hole 20L in the thin plate W as shown on the left side in FIG. 7. Then, another non-illustrated punch and die cooperate to punch a center hole 2a in the thin plate W as shown at the center of FIG. 7. Thereafter, the core piece 2 that is the same as that shown in FIG. 2 is punched out of the thin plate W as shown on right side in FIG. 7 by the rotary lamination apparatus 51 shown in FIG. 6. More specifically, the punch 58 of the rotary lamination apparatus 51 is lowered, and the punch 58 and the die 54 cooperate to punch the thin plate W placed on the die 54. The obtained core piece 2 is placed on the receiving table 55. Then, each time the core piece 2 is punched out, the die 54 is rotated at the predetermined angle. In this manner, the core pieces 2 are rotated and laminated on the receiving table 55 and form the lamination body 1.

Figure 8:
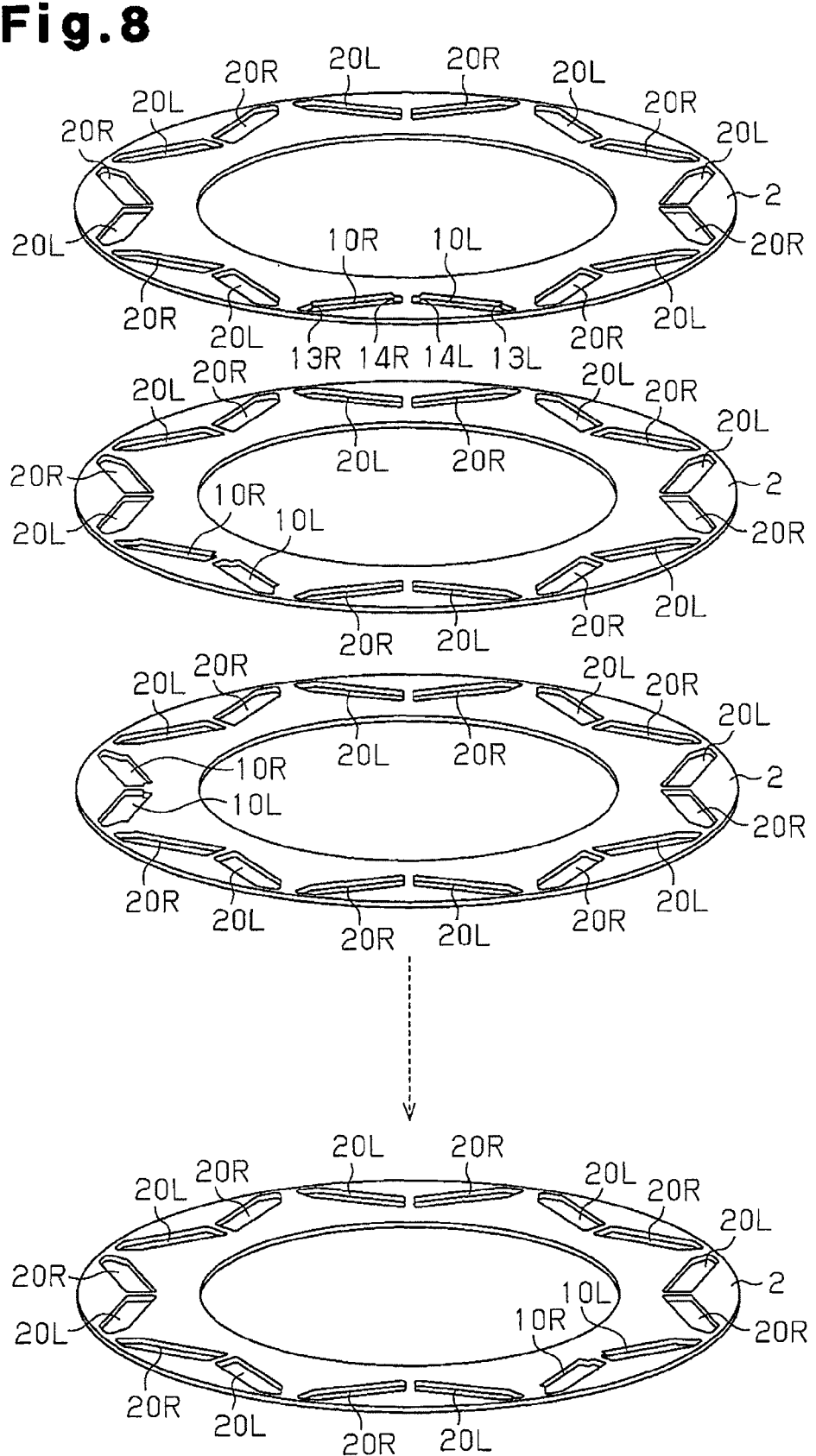
FIG. 8 is a schematic diagram illustrating the manner in which the core pieces of the first embodiment are rotated and laminated, in other words.

The core piece 2 that is punched out by cooperation of the punch 58 and the die 54 of the rotary lamination apparatus 51 shown in FIG. 6 is rotated by 45 degrees with respect to the previously punched core piece 2 by the rotation of the holding member 53, and is then laminated on the previously punched core piece 2 as shown in FIG. 8. Thus, in the lamination body 1, the pair of the first right elongated hole 10R and the first left elongated hole 10L of each core piece 2 is displaced in turn by the predetermined angle, which is 45 degrees.

Thereafter, the permanent magnets 5 are inserted in the insertion holes 1R, 1L of the thus formed lamination body 1. Then, the gaps S1 to S4 between the inner wall of the insertion holes 1R, 1L and the permanent magnets 5 are filled with filling material such as plastic material to embed the permanent magnets 5. At this time, the positions of the permanent magnets 5 are determined by the position determining portions 13R, 13L, 14R, 14L.

Each of the right insertion holes 1R of the lamination body 1 is configured by the first right elongated holes 10R of some of the core pieces 2 and the second right elongated holes 20R of the remaining core pieces 2. Thus, the position of each permanent magnet 5 inserted in the associated insertion hole 1R is reliably determined inside the right insertion hole 1R by the position determining portions 13R, 14R of the first right holes elongated 10R that configure part of the right insertion hole 1R. Also, unlike the case in which each right insertion hole 1R of the lamination body 1 is configured only by the first right elongated holes 10R, magnetic flux does not leak through the position determining portions 13R, 14R. Thus, the magnetic flux efficiently flows from the permanent magnets 5 inserted in the right insertion holes 1R of the lamination body 1 to the stator.

Each of the left insertion holes 1L of the lamination body 1 is configured by the first left elongated holes 10L of some of the core pieces 2 and the second left elongated holes 20L of the remaining core pieces 2. Thus, the position of each permanent magnet 5 inserted in the associated insertion hole 1L is reliably determined inside the left insertion hole 1L by the position determining portions 13L, 14L of the first left elongated holes 10L that configure part of the left insertion hole 1L. Also, unlike the case in which each left insertion hole 1L of the lamination body 1 is configured only by the first left elongated holes 10L, the magnetic flux does not leak through the position determining portions 13L, 14L. Thus, the magnetic flux efficiently flows from the permanent magnets 5 inserted in the left insertion holes 1L of the lamination body 1 to the stator.

The method for manufacturing the rotor core according to the first embodiment has the following advantages.

(1) Each insertion hole 1R, 1L of the lamination body 1 is configured by overlapping the first elongated holes 10R, 10L of some of the core pieces 2, in which the position determining portions 13R, 13L, 14R, 14L are formed, and the second elongated holes 20R, 20L of the remaining core pieces 2, in which no position determining portions are formed. Thus, the positions of the permanent magnets 5 in the insertion holes 1R, 1L are easily determined, and reduction in the leakage of the magnetic flux improves output torque of the motor.

(2) The number of the first elongated holes 10R, 10L of each insertion hole 1R, 1L of the lamination body 1 is equal to each other. That is, the number of the position determining portions 13R, 13L, 14R, 14L provided in each of the insertion holes 1R, 1L is equal to the number of the position determining portions 13R, 13L, 14R, 14L provided in each of the other insertion holes 1R, 1L. Thus, the level of the magnetic flux that flows from the permanent magnets 5 inserted in the insertion holes 1R, 1L to the stator is prevented from being varied among the permanent magnets 5. This reduces torque fluctuation of the motor.

(3) The number of the first elongated holes 10R, 10L of each insertion hole 1R, 1L of the lamination body 1 is about one eighth of the total number of the first elongated holes 10R, 10L and the second elongated holes 20R, 20L of the insertion hole 1R, 1L. This reduces resistance when inserting the permanent magnets 5 in the insertion holes 1R, 1L and thus facilitates insertion of the permanent magnets 5.

(4) Since the position determining portions 13R, 13L, 14R, 14L are provided in the insertion holes 1R, 1L of the lamination body 1, the permanent magnets 5 are prevented from being displaced during rotation of the rotor in a suitable manner.

Second Embodiment

A second embodiment of the present invention will now be described with reference to FIGS. 9 and 10.

In the case of the method for manufacturing the rotor core according to the afore-mentioned first embodiment, all the core pieces 2 including the core piece 2 located at the trailing end in the direction in which the permanent magnets 5 are inserted in the insertion holes 1R, 1L of the lamination body 1 have one pair of the first right elongated hole 10R and the first left elongated hole 10L and seven pairs of the second right elongated hole 20R and the second left elongated hole 20L as shown in FIGS. 2, 5(a), and 5(b).

Figure 9:
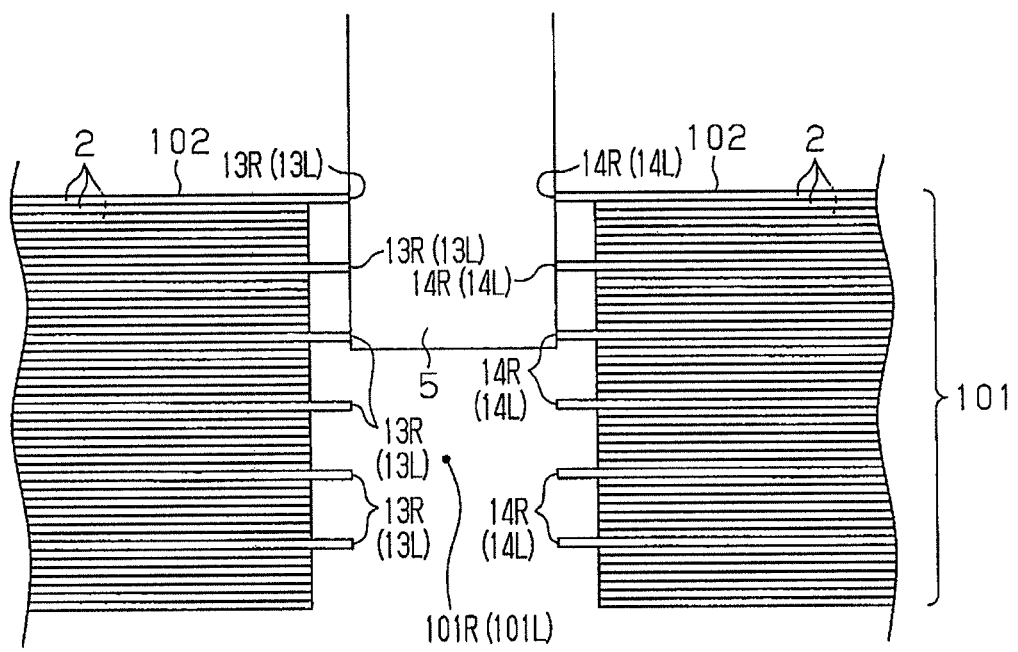
FIG. 9 is a cross-sectional view illustrating a rotor core according to a second embodiment of the present invention.
Figure 10:
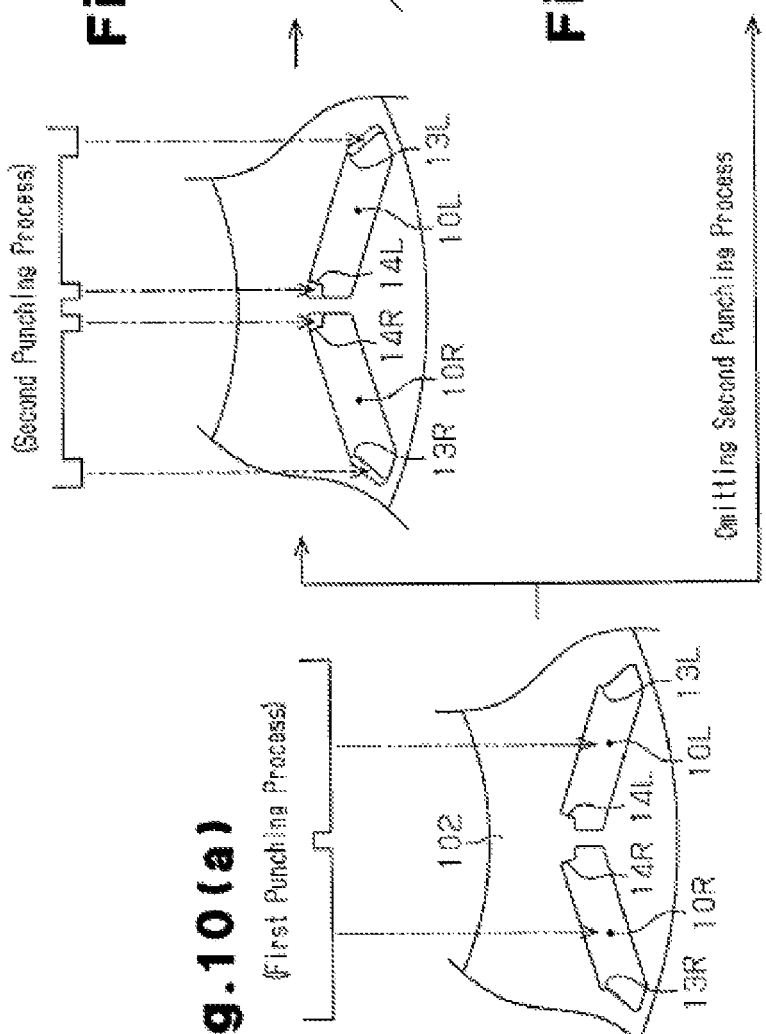
FIGS. 10(a), 10(b), 10(c) and 10(d) are schematic diagrams illustrating the processes for forming core pieces according to the second embodiment.

In contrast, in the second embodiment, as shown in FIG. 9, a core piece 102 located at the trailing end (at the top in the drawing) in the direction in which the permanent magnets 5 are inserted in insertion holes 101R, 101L of a lamination body 101 includes eight pairs of the first right elongated hole 10R, in which the position determining portions 13R, 14R are provided, and the first left elongated hole 10L, in which the position determining portions 13L, 14L are provided, and does not include the second right elongated hole 20R and the second left elongated hole 20L.

A method for manufacturing the rotor core according to the second embodiment will now be described with reference to FIGS. 10(a) to 10(d).

When manufacturing the lamination body 101 configuring the rotor core, unlike the afore-mentioned first embodiment, the lamination body 101 is not formed by rotating and laminating the core pieces, but the punching process is changed between the case in which the core piece 102 to be located at the trailing end is formed and the case in which the remaining core pieces 2 are formed.

That is, in a first punching process shown in FIG. 10(a), the punch and the die cooperate to form the core pieces 102, in each of which eight pairs of the first right elongated hole 10R and the first left elongated hole 10L are punched from a thin plate placed on the die. Then, in a second punching process shown in FIG. 10(b), the punch and the die cooperate to punch and remove the part indicated by broken lines in which a long dash alternates with a pair of short dashes in FIG. 10(b), that is, the position determining portions 13R, 13L, 14R, 14L from the core piece 102 placed on the die so that seven pairs of the second right elongated hole 20R and the second left elongated hole 20L as shown in FIG. 10(c) are formed. The position of the pair of the first right elongated hole 10R and the first left elongated hole 10L from which the position determining portions 13R, 13L, 14R, 14L are not punched is changed by rotating the punch by 45 degrees each time the second punching process is executed.

After a desired number of the core pieces 2 are formed by repeating the first punching process and the second punching process, the last core piece 102 is formed. The core piece 102 is formed by omitting the second punching process as shown in FIG. 10(d). That is, the core piece 102 formed by the first punching process is laminated on the core pieces 2 without being processed further.

When inserting the permanent magnets 5 in the insertion holes 101R, 101L of the lamination body 101, the permanent magnets 5 are guided by the position determining portions 13R, 13L, 14R, 14L of the first right elongated hole 10R and the first left elongated hole 10L of the core piece 102, which is located at the trailing end in the insertion direction, and are thus held in an appropriate posture without being inclined with respect to the insertion holes 101R, 101L. Thus, the distal ends of the permanent magnets 5 are prevented from being caught by the position determining portions 13R, 13L, 14R, 14L located in the middle of the insertion holes 101R, 101L.

The method for manufacturing the rotor core according to the second embodiment has the following advantage in addition to the advantages (1) to (4) of the afore-mentioned first embodiment.

(5) The core piece 102, which is located at the trailing end in the direction in which the permanent magnets 5 are inserted in the insertion holes 101R, 101L of the lamination body 101, includes eight pairs of the first right elongated hole 10R, in which the position determining portions 13R, 14R are formed, and the first left elongated hole 10L, in which the position determining portions 13L, 14L are formed. Thus, the distal ends of the permanent magnets 5 are prevented from being caught by the position determining portions 13R, 13L, 14R, 14L located in the middle of the insertion holes 101R, 101L. This facilitates inserting the permanent magnets 5 in the insertion holes 101R, 101L of the lamination body 101.

Third Embodiment

A third embodiment of the present invention will now be described with reference to FIG. 11.

In the third embodiment, as shown in FIG. 11, the closer to the trailing end (upper end in the drawing) in the direction in which the permanent magnets 5 are inserted in insertion holes 201R, 201L of a lamination body 201, the greater the ratio of the number of the first right elongated holes 10R, in which the position determining portions 13R, 14R are provided, and the first left elongated holes 10L, in which the position determining portions 13L, 14L are provided, in the core pieces 102 becomes. More specifically, two or more (five, in the present embodiment) core pieces 102 are located at or near the trailing end in the direction in which the permanent magnets 5 are inserted in the insertion holes 201R, 201L of the lamination body 201. Each core piece 102 includes eight pairs of the first right elongated hole 10R, in which the position determining portions 13R, 14R are provided, and the first left elongated hole 10L, in which the position determining portions 13L, 14L are provided, and does not include the second right elongated hole 20R or the second left elongated hole 20L.

In the third embodiment, the lamination body 201 is formed by using the apparatus that is the same as the afore-mentioned second embodiment. That is, after forming a desired number of the core pieces 2 by repeating the above-mentioned first punching process and the second punching process, the core pieces 102 are formed by omitting the second punching process. That is, the core pieces 102 formed by the first punching process are laminated on the core pieces 2 without being processed further.

When inserting the permanent magnets 5 in the insertion holes 201R, 201L of the lamination body 201, the permanent magnets 5 are held in a further appropriate posture with respect to the insertion holes 201R, 201L since the permanent magnets 5 are continuously guided by the position determining portions 13R, 13L, 14R, 14L of the first right elongated holes 10R and the first left elongated holes 10L of the core pieces 102, which are located at or near the trailing end in the insertion direction. Thus, the distal ends of the permanent magnets 5 are further prevented from being caught by the position determining portions 13R, 13L, 14R, 14L located in the middle of the insertion holes 201R, 201L.

The method for manufacturing the rotor core according to the third embodiment has the following advantage in addition to the advantages (1) to (4) of the first embodiment and advantage (5) of the second embodiment.

(6) The closer to the trailing end in the direction in which the permanent magnets 5 are inserted in the insertion holes 201R, 201L of the lamination body 201, the greater the ratio of the number of the first right elongated hole 10R, in which the position determining portions 13R, 14R are provided, and the first left elongated hole 10L, in which the position determining portions 13L, 14L are provided, in the core pieces 102 becomes. More specifically, the core pieces 102, which are located at or near the trailing end in the direction in which the permanent magnets 5 are inserted in the insertion holes 201R, 201L of the lamination body 201, each include eight pairs of the first right elongated hole 10R and the first left elongated hole 10L. Thus, the distal ends of the permanent magnets 5 are further prevented from being caught by the position determining portions 13R, 13L, 14R, 14L located in the middle of the insertion holes 201R, 201L, and the permanent magnets 5 are further easily inserted in the insertion holes 201R, 201L of the lamination body 201.

Modifications

The method for manufacturing the rotor core according to the present invention is not limited to the configuration illustrated in the above-described embodiments, but may be modified as follows.

In the above-mentioned first embodiment, the total number of the pairs of the first right elongated hole 10R and the first left elongated hole 10L and the pairs of the second right elongated hole 20R and the second left elongated hole 20L of each core piece 2 is eight, and the pairs are arranged at equal angular intervals (45 degrees) in the circumferential direction of the core piece 2. However, the total number of the pairs is not limited to eight, but may be greater than or less than eight. For example, the total number of the pairs may be six and the pairs may be arranged at intervals of 60 degrees, or the total number of the pairs may be four, and the pairs may be arranged at intervals of 90 degrees. Such core pieces 2 can be formed by changing the rotational angle of the die 54 of the rotary lamination apparatus 51 as required.

In the above-mentioned first to third embodiments, the lamination body 1 includes pairs of the right insertion hole 1R and the left insertion hole 1L. However, the present invention is not limited to this. As disclosed in Japanese Laid-Open Patent Publication No. 2007-20350, the insertion holes of the lamination body 1 do not necessarily need to form pairs. In this case, the insertion holes may be elongated in a tangential direction of the core pieces configuring the lamination body 1.

In the first embodiment, the rotational angle of the die 54 of the rotary lamination apparatus 51 may be changed to another rotational angle, for example, 90 degrees when laminating the core pieces 2.

The lamination body 1 configured as illustrated in the first embodiment may be formed by the apparatus illustrated in the second or third embodiment, that is, the apparatus that can execute the first punching process shown in FIG. 10(a) and the second punching process shown in FIG. 10(b).

The insertion holes of the lamination body are not limited to those illustrated in the above-described embodiments and modifications. Each insertion hole of the lamination body is preferably formed by overlapping the holes provided in the core pieces, and at least two of the holes of the core pieces preferably have the position determining portions for determining the position of the associated permanent magnet. In this case, at least two position determining portions determine the position of the permanent magnet in each insertion hole of the lamination body.

Also, the present invention is not limited to the configuration in which a single permanent magnet is inserted in each insertion hole of the lamination body. The present invention may be configured such that permanent magnets split in the axial direction of the insertion hole are inserted in each insertion hole. For example, in a case in which the permanent magnet split into two is inserted in each insertion hole of the lamination body, each insertion hole preferably has at least four position determining portions for determining the position of the permanent magnets. More specifically, position determining portions for determining the position of one of the split bodies are preferably formed in the holes of at least two of the core piece, and position determining portions for determining the position of the other split body are preferably formed in the holes of other two core pieces. In this case, the positions of the two split bodies of the permanent magnet are reliably determined in each insertion hole of the lamination body.

Similarly, for example, in a case in which the permanent magnet split into three is inserted in each insertion hole of the lamination body, each insertion hole preferably has at least six position determining portions for determining the position of the permanent magnet. More specifically, position determining portions for determining the position of one of the split bodies are preferably formed in the holes of at least two of the core pieces, position determining portions for determining the position of another split body are preferably formed in the holes of other two of the core pieces, and position determining portions for determining the position of the other split body are preferably formed in the holes of other two of the core pieces. In this case, in each insertion hole of the lamination body, the positions of the three split bodies of the permanent magnet are reliably determined.

In short, in the configuration in which the permanent magnet that is split into n split bodies is inserted in each insertion hole of the lamination body, each insertion hole of the lamination body preferably has at least 2×n position determining portions for determining the position of the permanent magnet.

What is claimed is:
1. A method for manufacturing a rotor core comprising:
forming thin plate-shaped core pieces, each having a plurality of holes; forming a lamination body including a plurality of insertion holes by laminating the core pieces in a stacking position, the plurality of insertion holes being formed by said plurality of holes in each of said core pieces in the stacking position; and
inserting and embedding a permanent magnet in each of the insertion holes of the lamination body, wherein
the plurality of holes of each core piece include one or more first holes, in each of the one or more first holes a position determining portion for determining a position of a corresponding inserted permanent magnet is formed, and one or more second holes of the plurality of holes, in each of the one or more second holes a position determining portion is not formed, each of the one or more first holes and each of the one or more second holes accommodating a corresponding inserted permanent magnet, and
each of the plurality of insertion holes of the lamination body has at least one of the first holes and at least one of the second holes such that each of the plurality of insertion holes is correspondingly formed by the at least one of the first holes and the at least one of the second holes of each of the core pieces in the stacking position.

2. The method for manufacturing the rotor core according to claim 1, wherein
a ratio of the number of the one or more first holes in each of the core pieces is greater toward a trailing end in a direction in which the permanent magnets are inserted in the plurality of insertion holes of the lamination body.

3. The method for manufacturing the rotor core according to claim 1, wherein
one of the core pieces that is located at a trailing end in a direction in which the permanent magnets are inserted in the plurality of insertion holes of the lamination body includes a first hole, in which a position determining portion for determining the position of the corresponding permanent magnet is formed, and does not include any second hole, in which the position determining portion is not formed.

4. The method for manufacturing the rotor core according to claim 3, wherein
the one of the core pieces located at the trailing end in the direction in which the permanent magnets are inserted in the plurality of insertion holes of the lamination body and one or more adjacent core pieces each include first holes, in each of which the position determining portion for determining the position of the permanent magnet is formed, and do not include any second hole, in which the position determining portion is not formed.

5. The method for manufacturing the rotor core according to claim 1, wherein
the number of the one or more first holes of each of the plurality of insertion holes of the lamination body is equal to each other.

6. The method for manufacturing the rotor core according to claim 1, wherein
each of the one or more first holes includes a first gap between a wall defining an outer end of each of the one or more first holes and a first side surface of the inserted permanent magnet.

7. The method for manufacturing the rotor core according to claim 6, wherein
each of the one or more first holes includes a second gap between a wall defining an inner end of each of the one or more first holes and a second side surface of the inserted permanent magnet.

8. The method for manufacturing the rotor core according to claim 1, wherein
each of the one or more second holes includes a third gap between a wall defining an outer end of each of the one or more second holes and a first side surface of the inserted permanent magnet.

9. The method for manufacturing the rotor core according to claim 8, wherein
each of the one or more second holes includes a fourth gap between a wall defining an inner end of each of the one or more second holes and a second side surface of the inserted permanent magnet.

10. The method for manufacturing the rotor core according to claim 7, wherein
each of the one or more second holes includes a third gap between a wall defining an outer end of each of the one or more second holes and a first side surface of the inserted permanent magnet,
each of the one or more second holes includes a fourth gap between a wall defining an inner end of each of the one or more second holes and a second side surface of the inserted permanent magnet, and
the third and fourth gaps of the one or more second holes are larger than the first and second gaps of the one or more first holes.

11. The method for manufacturing the rotor core according to claim 1, wherein
each of the core pieces defines a first bridge portion between adjacent first holes and defines a second bridge portion between adjacent second holes.

12. The method for manufacturing the rotor core according to claim 11, wherein
the bridge portion provided between the adjacent second holes is smaller than the bridge portion provided between the adjacent first holes.

13. The method for manufacturing the rotor core according to claim 1, wherein
the position determining portion is a step portion of the core piece that abuts the inserted permanent magnet.

14. The method for manufacturing the rotor core according to claim 1, wherein
each of the one or more first holes of each of the core pieces is aligned with at least one of the one or more second holes of the other core pieces in a lamination direction of the core pieces.

* * * * *